United States Patent

Shih et al.

(10) Patent No.: US 10,057,500 B2
(45) Date of Patent: Aug. 21, 2018

(54) IMAGE CAPTURING METHOD AND MONITORING APPARATUS WITH SUPPLEMENTAL LIGHTING MODULATION

(71) Applicant: VIVOTEK INC., New Taipei (TW)

(72) Inventors: Li-Shan Shih, New Taipei (TW); Yi-Chuan Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/698,658

(22) Filed: Sep. 8, 2017

(65) Prior Publication Data

US 2018/0084179 A1  Mar. 22, 2018

(30) Foreign Application Priority Data

Sep. 19, 2016 (TW) ............................. 105130113 A

(51) Int. Cl.
*H04N 5/235* (2006.01)
*H04N 9/04* (2006.01)
*G06K 9/32* (2006.01)
*H04N 5/14* (2006.01)

(52) U.S. Cl.
CPC ......... *H04N 5/2354* (2013.01); *G06K 9/3258* (2013.01); *H04N 5/144* (2013.01); *H04N 9/045* (2013.01)

(58) Field of Classification Search
CPC ......... G03B 15/02; G03B 7/16; G06K 9/2027
See application file for complete search history.

(56) References Cited

U.S. PATENT DOCUMENTS

| | | | |
|---|---|---|---|
| 2008/0285803 A1* | 11/2008 | Madsen ................ | G01S 17/026 382/105 |
| 2012/0105639 A1* | 5/2012 | Stein ...................... | H04N 5/235 348/148 |
| 2013/0235203 A1* | 9/2013 | Billington ............ | G06K 9/2036 348/148 |
| 2014/0198219 A1* | 7/2014 | Chuang ................ | H04N 5/2354 348/164 |
| 2014/0347511 A1* | 11/2014 | Rodriguez-Serrano | H04N 5/23222 348/222.1 |
| 2015/0163390 A1* | 6/2015 | Lee ...................... | H04N 5/2352 348/149 |
| 2016/0152177 A1* | 6/2016 | Dandrow .............. | B60R 13/105 315/77 |
| 2017/0299435 A1* | 10/2017 | Rhoads ................. | G01J 3/2823 |

* cited by examiner

*Primary Examiner* — Shahbaz Nazrul
(74) *Attorney, Agent, or Firm* — Winston Hsu

(57) ABSTRACT

An image capturing method with supplemental lighting modulation is applied to a monitoring apparatus having a lighting unit and an image detecting unit. The image capturing method includes dividing a working period of the lighting unit into at least one first sub-period and at least one second sub-period, driving the lighting unit to respectively output supplemental light with different intensity during the first sub-period and the second sub-period, driving the image detecting unit to respectively capture a set of monitoring images with a predetermined amount during the first sub-period and the second sub-period, comparing the monitoring image captured in the first sub-period with ones captured in the second sub-period, analyzing definition of the set of monitoring images, and selecting a corresponding monitoring image having the definition greater than a threshold to execute image recognition.

20 Claims, 4 Drawing Sheets

IMAGE CAPTURING METHOD AND MONITORING APPARATUS WITH SUPPLEMENTAL LIGHTING MODULATION

BACKGROUND OF THE INVENTION

1. Field of the Invention

The present invention relates to an image capturing method and a related monitoring apparatus, and more particularly, to an image capturing method and a related monitoring apparatus with supplemental lighting modulation.

2. Description of the Prior Art

With a change of society culture, people inhabit a region inside the big city, and vehicles are widespread applied for transportation. For better effective management of the vehicles, the monitoring apparatus can be disposed on the road to record a trace of the vehicle within the monitoring region in full time. The monitoring apparatus is utilized capture the plate number of the vehicle, and a night mode of the monitoring apparatus further provides supplemental light by an infrared light source to ensure that the captured plate number can be recognized even through the vehicle is in the dark. The vehicle plate may have various forms (such as the motorbike plate, the new and former type of the automobile plate and the trunk plate) and be made by various reflective material, and definition of the monitoring image can be effected by material of the vehicle plate; for example, as if the vehicle plate is made by the high reflective material, a pattern of the plate number inside the monitoring image is difficult to recognize because of light reflection on the vehicle plate, and a conventional solution is adapted to decrease intensity of the supplemental light so as to prevent over-exposure of the monitoring image. A daytime mode of the monitoring apparatus can be applied in the low supplemental illumination to dim the monitoring image, while the vehicle with the plate made by low reflective material passes through the monitoring region, the monitoring apparatus cannot recognize the pattern about the vehicle plate made by the low reflective material inside the monitoring image due to low illumination, which means the vehicle plate number cannot be recognized clearly. Therefore, design of an image capturing method and a related monitoring apparatus capable of recognizing any reflective material is an important issued in the monitor industry.

SUMMARY OF THE INVENTION

The present invention provides an image capturing method and a related monitoring apparatus with supplemental lighting modulation for solving above drawbacks.

According to the claimed invention, an image capturing method with supplemental lighting modulation is applied to a monitoring apparatus having a lighting unit and an image detecting unit. The image capturing method includes dividing a working period of the lighting unit into at least one first sub-period and at least one second sub-period, driving the lighting unit to respectively emit supplemental light with different intensity during the first sub-period and the second sub-period, driving the image detecting unit to respectively capture a set of monitoring images with a predetermined amount during the first sub-period and the second sub-period, comparing the monitoring image captured in the first sub-period with ones captured in the second sub-period, and analyzing definition of the set of monitoring images and selecting one of the monitoring images having the definition greater than a threshold to execute image recognition.

According to the claimed invention, a monitoring apparatus with supplemental lighting modulation includes a lighting unit and an image detecting unit. The lighting unit is adapted to emit supplemental light having adjustable intensity. The image detecting unit is electrically connected to the lighting unit, and adapted to divide a working period of the lighting unit into at least one first sub-period and at least one second sub-period, drive the lighting unit to respectively emit supplemental light with different intensity during the first sub-period and the second sub-period, drive the image detecting unit to respectively capture a set of monitoring images with a predetermined amount during the first sub-period and the second sub-period, compare the monitoring image captured in the first sub-period with ones captured in the second sub-period, and analyze definition of the set of monitoring images and selecting one of the monitoring images having the definition greater than a threshold to execute image recognition, so as to clearly recognize a plurality of objects respectively made by different reflective material.

As material of the vehicle plate is known, the monitoring apparatus and the related image capturing method of the present invention can drive the lighting unit to respectively emit different supplemental light during different sub-periods of the working period, and the image detecting unit can capture the first monitoring image and the second monitoring image respectively with predetermined amounts during the different sub-periods (such as the first sub-period and the second sub-period). The first monitoring image can be captured under low supplemental illumination to clearly recognize the vehicle plate number made by high reflective material, and the second monitoring image can be captured under high supplemental illumination to helpfully recognize the vehicle plate number made by low reflective material. Thus, the monitoring apparatus can immediately capture the monitoring images under different supplemental illumination no matter what the reflective material of the object passing through the monitoring region is made, so as to select the specific monitoring image (which conforms to predetermined condition) for executing the image recognition.

Each sub-period of the working period and the supplemental light of each sub-period (having the intensity different from the supplemental light of another sub-period) can be designed in accordance with the known material of the vehicle plate, so that some of the monitoring images captured by the monitoring apparatus during the working period should be able to clearly show the plate number. As if the vehicle plate is made by unknown material, the image capturing method of the present invention further can provide a learning process capable of actively adjusting the supplemental light intensity, the learning process can slightly adjust the supplemental light according to results of whether the monitoring apparatus finds out the clear monitoring image, whether a pattern inside the clear monitoring image is blurred, and whether recognition of the whole clear monitoring images conform to the specific condition, so as to effectively achieve the accurate vehicle plate recognition. Certainly, the foresaid learning process about active adjustment of the supplemental light can be applied to the vehicle plate made by the known material. The image capturing method and the related monitoring apparatus with supplemental lighting modulation of the present invention can accurately and rapidly recognize the objects made by various materials within the monitoring region.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
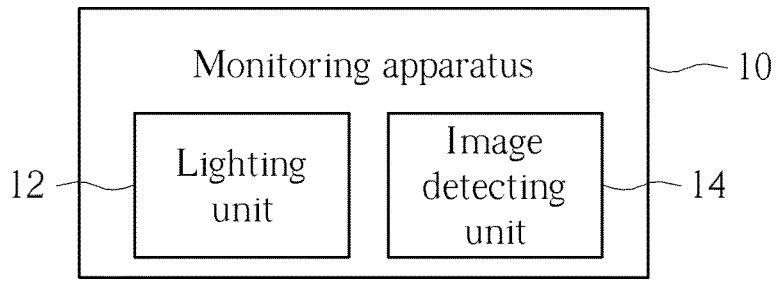
FIG. 1 is a functional block diagram of a monitoring apparatus according to an embodiment of the present invention.
Figure 2:
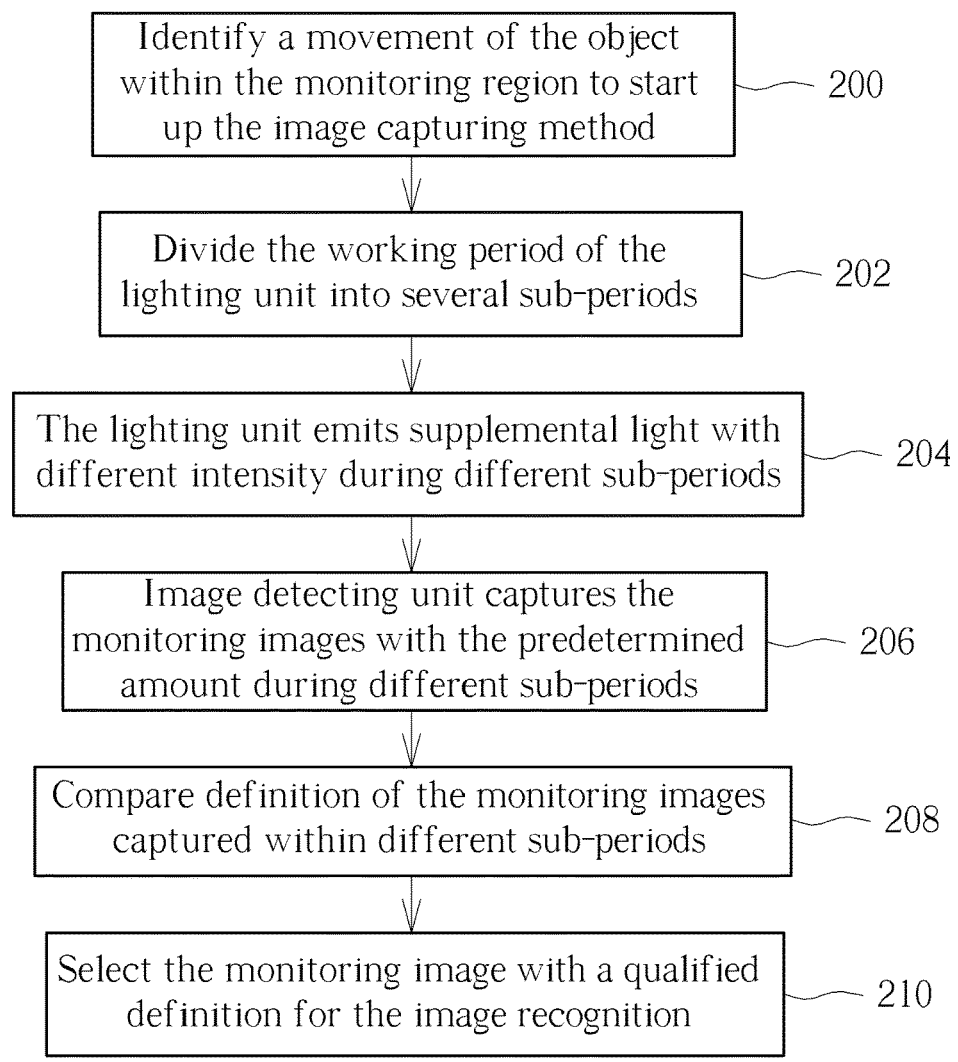
FIG. 2 is a flow chart of an image capturing method according to the embodiment of the present invention.
Figure 3:
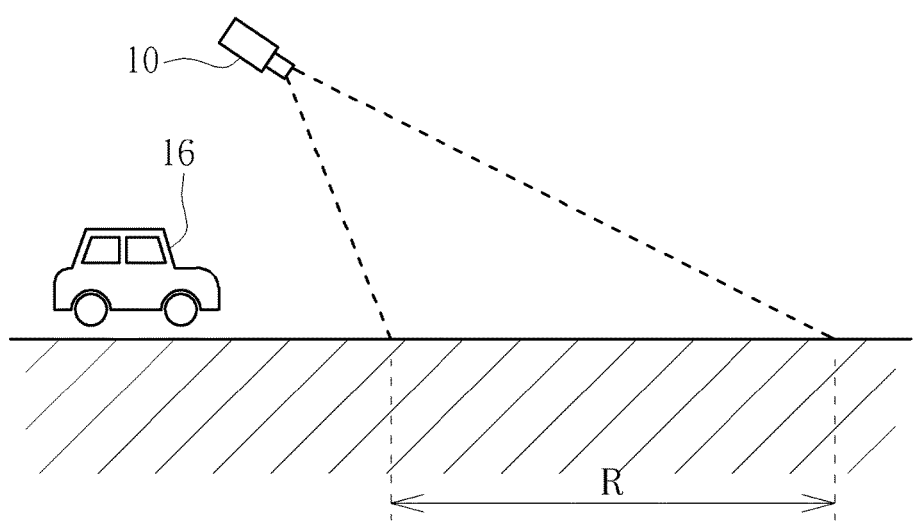
FIG. 3 is a diagram of the monitoring apparatus 10 and an object 16 according to the embodiment of the present invention.
Figure 4:
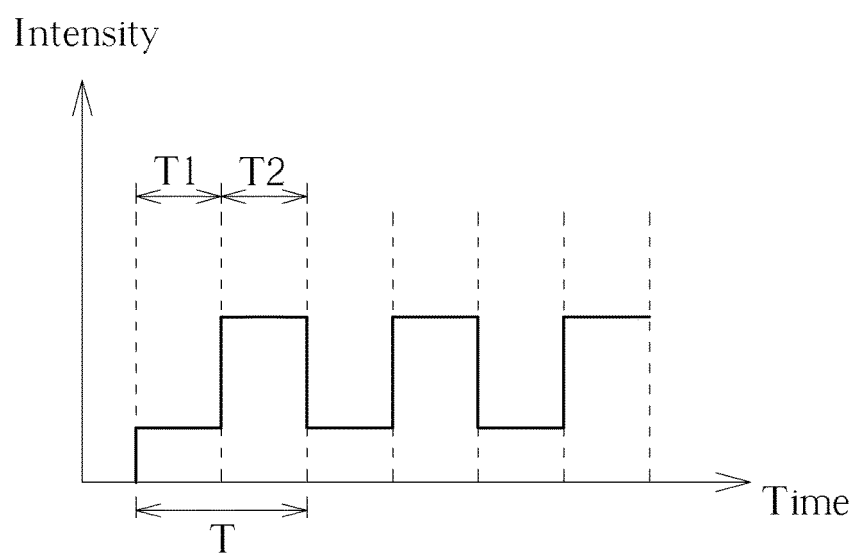
FIG. 4 is a diagram of intensity variation emitted from a lighting unit 12 according to the embodiment of the present invention.

Please refer to FIG. 1 to FIG. 4. FIG. 1 is a functional block diagram of a monitoring apparatus 10 according to an embodiment of the present invention. FIG. 2 is a flow chart of an image capturing method according to the embodiment of the present invention. FIG. 3 is a diagram of the monitoring apparatus 10 and an object 16 according to the embodiment of the present invention. FIG. 4 is a diagram of intensity variation emitted from a lighting unit 12 according to the embodiment of the present invention. The monitoring apparatus 10 includes a lighting unit 12 and an image detecting unit 14 electrically connected with each other. The monitoring apparatus 10 is disposed on a fixed location and adapted to detect the object 16 within its monitoring region. The image detecting unit 14 can capture a monitoring image about the monitoring region; while environmental illumination is dark, the lighting unit 12 emits supplemental light to illuminate the monitoring region, and the image detecting unit 14 can capture the clear monitoring image about the monitoring region. In the present invention, intensity of the supplemental light emitted from the lighting unit 12 is adjustable, and the monitoring apparatus 10 can arbitrarily adjust the intensity of the supplemental light emitted from the lighting unit 12 according to reflective feature of the object 16, so that the image detecting unit 14 can capture the preferred monitoring image accordingly.

For example, while the monitoring apparatus 10 is applied to traffic monitoring system and the object 16 is a vehicle on the road, the image detecting unit 14 can utilize adjustable characteristic of the supplemental light emitted from the lighting unit 12 to adaptably capture the clear monitoring image in accordance with the reflective feature of the object 16, so as to accurately recognize a plate number (which means the license number) of the vehicle. In a possible embodiment, the image detecting unit 14 may include an image capturing element and an image analyzing element (not shown in figures), the image capturing element can be an image sensor adapted to capture the image and acquire the monitoring image, the image analyzing element executes image recognition according to the monitoring image. The image capturing element and the image analyzing element can be disposed inside the same camera device, or the image analyzing element may be set inside an image processing system separated from the camera device. In addition, the monitoring apparatus and the related image capturing method of the present invention not only can recognize the plate number, but also can be applied to any kind of the image recognition, such as human face recognition, fingerprint recognition, iris recognition, and is not limited to the plate number recognition of the above-mentioned embodiment.

The image capturing method illustrated in FIG. 2 is suitable for the monitoring apparatus 10 shown in FIG. 1. First, step 200 is execute that the monitoring apparatus 10 provides a specific mode which can start up the image capturing method while a movement of the object 16 is detected within the monitoring region R. In another possible embodiment, the user can optionally actuate the specific mode provided by the monitoring apparatus 10 via an operation interface for execution of the image capturing method. Moreover, in another possible embodiment, the user can set a monitoring zone within the monitoring region R, and step 202 can execute the image capturing method while the object 16 enters into the monitoring zone. Then, steps 202 and 204 are executed that the monitoring apparatus 10 can divide a working period T of the lighting unit 12 into several sub-periods, and the lighting unit 12 can emit the supplemental light with different intensity during different sub-periods; for example, the working period T can be divided into a first sub-period T1 and a second sub-period T2, intensity of the supplemental light emitted from the lighting unit 12 during the first sub-period T1 can be lower than intensity of the supplemental light emitted from the lighting unit 12 during the second sub-period T2.

Figure 5:
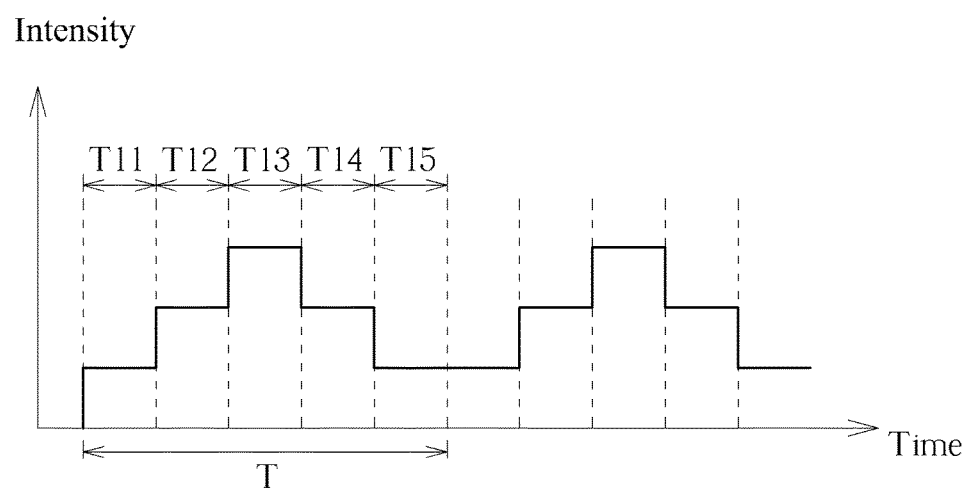
FIG. 5 is a diagram of intensity variation of the lighting unit 12 according to another embodiment of the present invention.

The present invention not only can divide the working period T into several sub-periods as mentioned above, but also can adjust the intensity of the supplemental light during each sub-period according to the user's actual demand. Please refer to FIG. 5. FIG. 5 is a diagram of intensity variation of the lighting unit 12 according to another embodiment of the present invention. In this embodiment, the working period T can be divided into five sub-periods, such as the continuous sub-periods T11, T12, T13, T14 and T15, and then related intensity of the supplemental light emitted during the said sub-periods T11, T12, T13, T14 and T15 can be shown in FIG. 5. Variation of the sub-periods T11, T12, T13, T14 and T15 may be represented as gradually increasing the intensity of the supplemental light, gradually decreasing the intensity of the supplemental light, or alternately increasing and decreasing the intensity of the supplemental light. Application of adjusting the intensity of the supplemental light is not limited to the above-mentioned embodiment, which can be varied according to the user's actual demand.

The object 16 can be the high-speed vehicle, the monitoring region R of the monitoring apparatus 10 may be limited by view ranges of the image detecting unit 14, and a time length of the working period T is preferably set in accordance with a moving velocity of the object 16 and a dimension of the monitoring region R. For example, while the moving velocity of the object 16 is slow and the monitoring region R is wide, the working period T has longer time length; while the moving velocity of the object 16 is fast and the monitoring region R is narrow, the working period T has shorter time length. The time lengths of the several sub-periods can be averaged according to total time length of the working period T and an amount of the sub-periods; however, the supplemental light with specific intensity may be matched with the large sub-period, and the supplemental light with normal intensity can be accordingly matched with the short sub-periods. An amount of the whole sub-periods and a length of each sub-period about the working period T are not limited to the above-mentioned embodiment, which depends on the user's actual demand.

Then, step 206 is executed that the image detecting unit 14 can capture the monitoring images with a predetermined amount during each sub-period, and a quantity of the monitoring image with the predetermined amount can be varied according to at least one of the time length of the working period T and a frame rate of the image detecting unit 14. While the working period T or sub-periods divided from the working period T has sufficient time length, the image detecting unit 14 can capture the monitoring images with more predetermined amount; while the working period T or the sub-periods divided from the working period T has insufficient time length, the image detecting unit 14 captures the monitoring images with less predetermined amount. Final, steps 208 and 210 are executed that the monitoring apparatus 10 can compare all the monitoring images captured within different sub-periods, compute definition of the monitoring images, select one or some of the monitoring images conforming to a standard (such like having the definition greater than a specific threshold), and utilize the standard monitoring image to execute the image recognition for getting the correct plate number of the vehicle.

In step 208, the image capturing method can set a region of interest (ROI) within the monitoring image, and position of the ROI can preferably correspond to a region whereinside the vehicle plate is located while a pattern of the vehicle is shifted inside the monitoring region R. The image capturing method can analyze and compare the pattern inside the ROI for decrease of systematic computation. In step 210, the image capturing method can determine that the intensity of the supplemental light in the current mode is matched with material reflectivity of the object 16 while the definition of the specific monitoring image is greater than the specific threshold or while an amount of the monitoring image having the definition greater than the specific threshold is larger than a predetermined value, and the pattern (which means the plate number) about the object 16 within the monitoring image can be clearly recognized, so that parameters of the supplemental light emitted from the lighting unit 12 respectively during the first sub-period T1 and the second sub-period T2 can be set as constant values, and the supplemental light intensity emitted from the lighting unit 12 during the first sub-period T1 and the second sub-period T2 can be steadied accordingly.

Some of the monitoring images captured by the image detecting unit 14 within the working period T may be acquired under high supplemental illumination, other monitoring images may be acquired under low supplemental illumination, and the foresaid monitoring image mixes cannot be visually observed in comfort. As step 210 is finished, the image capturing method of the present invention can optionally form a first image stream via the monitoring images captured by the image detecting unit 14 during the first sub-period T1, and further form a second image stream via the monitoring image during the second sub-period T2, the first image stream and the second image stream are respectively composed of the monitoring images captured by the same supplemental illumination, so the first image stream and the second image stream can be broadcast on the display screen of the computer system without flicker for comfortable visual observation.

Generally, the supplemental light emitted from the lighting unit 12 during different sub-periods are constant values, and the constant values can be steadied according to vehicle plate material of the object 16 located on a district where the monitoring apparatus 10 is set. For example, the official vehicle plate of the specific district may be made by two standard material, reflectivity of the said material are known, the monitoring apparatus 10 can define a predetermined table according to the known reflectivity of the material, and respectively adjust the supplemental light intensity emitted from the lighting unit 12 during different sub-periods in accordance with the predetermined table. Content of the predetermined table can be, but not limited to, the reflectivity, predetermined intensity of the supplemental light, related periods of the supplemental light, and so on. Besides, the image capturing method of the present invention can adjust the intensity of the supplemental light emitted from the lighting unit 12 according to an analysis result of the monitoring image; which means the image capturing method may adjust the supplemental light intensity of the lighting unit 12 while the definition of the monitoring image is compared with the specific threshold and cannot find out the clear image, or while the clear image is found and the plate number cannot be recognized due to the reflectivity of the object within the monitoring image, or while the clear image is found and an amount of the clear image cannot conform to the predetermined amount.

In conclusion, as material of the vehicle plate is known, the monitoring apparatus and the related image capturing method of the present invention can drive the lighting unit to respectively emit different supplemental light during different sub-periods of the working period, and the image detecting unit can capture the first monitoring image and the second monitoring image respectively with predetermined amounts during the different sub-periods (such as the first sub-period and the second sub-period). The first monitoring image can be captured under low supplemental illumination to clearly recognize the vehicle plate number made by high reflective material, and the second monitoring image can be captured under high supplemental illumination to helpfully recognize the vehicle plate number made by low reflective material. Thus, the monitoring apparatus can immediately capture the monitoring images under different supplemental illumination no matter what the reflective material of the object passing through the monitoring region is made, so as to select the specific monitoring image (which conforms to predetermined condition) for executing the image recognition.

Each sub-period of the working period and the supplemental light of each sub-period (having the intensity different from the supplemental light of another sub-period) can be designed in accordance with the known material of the vehicle plate, so that some of the monitoring images captured by the monitoring apparatus during the working period should be able to clearly show the plate number. As if the vehicle plate is made by unknown material, the image capturing method of the present invention further can provide a learning process capable of actively adjusting the supplemental light intensity, the learning process can slightly adjust the supplemental light according to results of whether the monitoring apparatus finds out the clear monitoring image, whether a pattern inside the clear monitoring image is blurred, and whether recognition of the whole clear monitoring images conform to the specific condition, so as to effectively achieve the accurate vehicle plate recognition. Certainly, the foresaid learning process about active adjustment of the supplemental light can be applied to the vehicle plate made by the known material; for example, the supplemental light intensity can be actively adjusted to effectively provide the accurate vehicle plate recognition while environmental illumination is varied. Comparing to the prior art, the image capturing method and the related monitoring apparatus with supplemental lighting modulation of the present invention can accurately and rapidly recognize the objects made by various material within the monitoring region.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing method with supplemental lighting modulation, applied to a monitoring apparatus having a lighting unit and an image detecting unit, the image capturing method comprising:
   dividing a working period of the lighting unit into at least one first sub-period and at least one second sub-period;
   driving the lighting unit to respectively emit supplemental light with different intensity during the first sub-period and the second sub-period;
   driving the image detecting unit to respectively capture a set of monitoring images with a predetermined amount during the first sub-period and the second sub-period;
   comparing the monitoring image captured in the first sub-period with ones captured in the second sub-period; and
   analyzing definition of the set of monitoring images and selecting one of the monitoring images having the definition greater than a threshold to execute image recognition.

2. The image capturing method of claim 1, wherein the monitoring apparatus is utilized to detect a movement of an object within a monitoring region, the image capturing method further comprises:
   setting a length of the working period according to a moving velocity of the object and a dimension of the monitoring region.

3. The image capturing method of claim 1, wherein a quantity of the set of monitoring images with the predetermined amount captured by the image detecting unit during at least one of the first sub-period and the second sub-period is adjusted according to a length of the working period.

4. The image capturing method of claim 1, wherein the monitoring apparatus is utilized to detect a movement of an object within a monitoring region, the image capturing method further comprises:
   analyzing a reflectivity of the object; and
   adjusting intensity of the supplemental light emitted from the lighting unit respectively during the first sub-period and the second sub-period according to the reflectivity.

5. The image capturing method of claim 1, further comprising:
   adjusting intensity of the supplemental light emitted from the lighting unit respectively during the first sub-period and the second sub-period according to a comparison result between the definition and the threshold.

6. The image capturing method of claim 1, wherein the monitoring apparatus is utilized to detect a movement of an object within a monitoring region, the object is a vehicle, and the image recognition is applied to recognize a plate number of the vehicle.

7. The image capturing method of claim 1, further comprising:
   forming a first image stream and a second image stream via the monitoring images captured by the image detecting unit respectively during the first sub-period and the second sub-period.

8. The image capturing method of claim 1, wherein the monitoring apparatus is utilized to execute the image capturing method while detecting a movement of an object within a monitoring region.

9. The image capturing method of claim 1, wherein intensity of the supplemental light emitted from the lighting unit respectively during the first sub-period and the second sub-period is steadied while the definition of the monitoring images are greater than the threshold.

10. The image capturing method of claim 9, further comprising:
    computing a quantity of the monitoring images having the definition greater than the threshold; and
    steadying intensity of the supplemental light emitted from the lighting unit respectively during the first sub-period and the second sub-period while the quantity is greater than a predetermined value.

11. A monitoring apparatus with supplemental lighting modulation, the monitoring apparatus comprises:
    a lighting unit adapted to emit supplemental light having adjustable intensity; and
    an image detecting unit electrically connected to the lighting unit, and adapted to divide a working period of the lighting unit into at least one first sub-period and at least one second sub-period, drive the lighting unit to respectively emit supplemental light with different intensity during the first sub-period and the second sub-period, drive the image detecting unit to respectively capture a set of monitoring images with a predetermined amount during the first sub-period and the second sub-period, compare the monitoring image captured in the first sub-period with ones captured in the second sub-period, and analyze definition of the set of monitoring images and selecting one of the monitoring images having the definition greater than a threshold to execute image recognition, so as to clearly recognize a plurality of objects respectively made by different reflective material.

12. The monitoring apparatus of claim 11, wherein the monitoring apparatus is utilized to detect a movement of an object within a monitoring region, the image detecting unit is further adapted to set a length of the working period according to a moving velocity of the object and a dimension of the monitoring region.

13. The monitoring apparatus of claim 11, wherein a quantity of the set of monitoring images with the predetermined amount captured by the image detecting unit during at least one of the first sub-period and the second sub-period is adjusted according to a length of the working period.

14. The monitoring apparatus of claim 11, wherein the monitoring apparatus is utilized to detect a movement of an object within a monitoring region, the image detecting unit is further adapted to analyze a reflectivity of the object, and to adjust intensity of the supplemental light emitted from the lighting unit respectively during the first sub-period and the second sub-period according to the reflectivity.

15. The monitoring apparatus of claim 11, wherein the image detecting unit is further adapted to adjust intensity of the supplemental light emitted from the lighting unit respectively during the first sub-period and the second sub-period according to a comparison result between the definition and the threshold.

16. The monitoring apparatus of claim 11, wherein the monitoring apparatus is utilized to detect a movement of an object within a monitoring region, the object is a vehicle, and the image recognition is applied to recognize a plate number of the vehicle.

17. The monitoring apparatus of claim 11, wherein the image detecting unit is further adapted to form a first image stream and a second image stream via the monitoring images captured by the image detecting unit respectively during the first sub-period and the second sub-period.

18. The monitoring apparatus of claim 11, wherein the monitoring apparatus is utilized to execute the image capturing method while detecting a movement of an object within a monitoring region.

19. The monitoring apparatus of claim 11, wherein intensity of the supplemental light emitted from the lighting unit respectively during the first sub-period and the second sub-period is steadied while the definition of the monitoring images are greater than the threshold.

20. The monitoring apparatus of claim 19, wherein the image detecting unit is further adapted to compute a quantity of the monitoring images having the definition greater than the threshold, and to steady intensity of the supplemental light emitted from the lighting unit respectively during the first sub-period and the second sub-period while the quantity is greater than a predetermined value.

* * * * *